(12) United States Patent
Buzzard et al.

(10) Patent No.: US 9,162,701 B2
(45) Date of Patent: Oct. 20, 2015

(54) STEERING COLUMN ENERGY ABSORBING RAKE LOCK

(71) Applicant: Steering Solutions IP Holding Corporation, Saginaw, MI (US)

(72) Inventors: Donald A. Buzzard, Saginaw, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/209,116

(22) Filed: Mar. 13, 2014

(65) Prior Publication Data

US 2014/0260763 A1 Sep. 18, 2014

Related U.S. Application Data

(60) Provisional application No. 61/779,385, filed on Mar. 13, 2013.

(51) Int. Cl.
*B62D 1/184* (2006.01)
*B62D 1/19* (2006.01)

(52) U.S. Cl.
CPC .............. *B62D 1/184* (2013.01); *B62D 1/195* (2013.01)

(58) Field of Classification Search
CPC ................................ B62D 1/184; B62D 1/195

USPC ...................................... 280/777, 775; 74/493
See application file for complete search history.

(56) References Cited

U.S. PATENT DOCUMENTS

| | | | |
|---|---|---|---|
| 6,419,269 B1 * | 7/2002 | Manwaring et al. | 280/775 |
| 7,327,733 B2 | 2/2008 | Liu | |
| 8,327,733 B2 | 12/2012 | Ozsoylu et al. | |
| 8,376,404 B2 | 2/2013 | Tinnin et al. | |
| 2009/0229399 A1 | 9/2009 | Ozsoylu et al. | |
| 2010/0300237 A1 * | 12/2010 | Ridgway et al. | 74/493 |

* cited by examiner

*Primary Examiner* — Ruth Ilan
(74) *Attorney, Agent, or Firm* — Cantor Colburn LLP

(57) ABSTRACT

A rake lock assembly for a steering column assembly includes a component operatively associated with a rake bracket, the component including a trigger element, and a locking cam configured to be disposed within the rake bracket and to rotate about a rotational axis. The locking cam includes a first contact surface configured to interact with the trigger element, and a second contact surface having a plurality of teeth configured to interact with rake teeth. When an impact force acts on the steering column assembly and a rake bolt is shuttled in a first direction, the trigger element is configured to contact the first contact surface and rotate the locking cam about the rotational axis such that the second contact surface plurality of teeth and the rake teeth are disposed in interlocking meshing engagement to facilitate preventing a vehicle steering column from raking movement in a second direction.

16 Claims, 8 Drawing Sheets

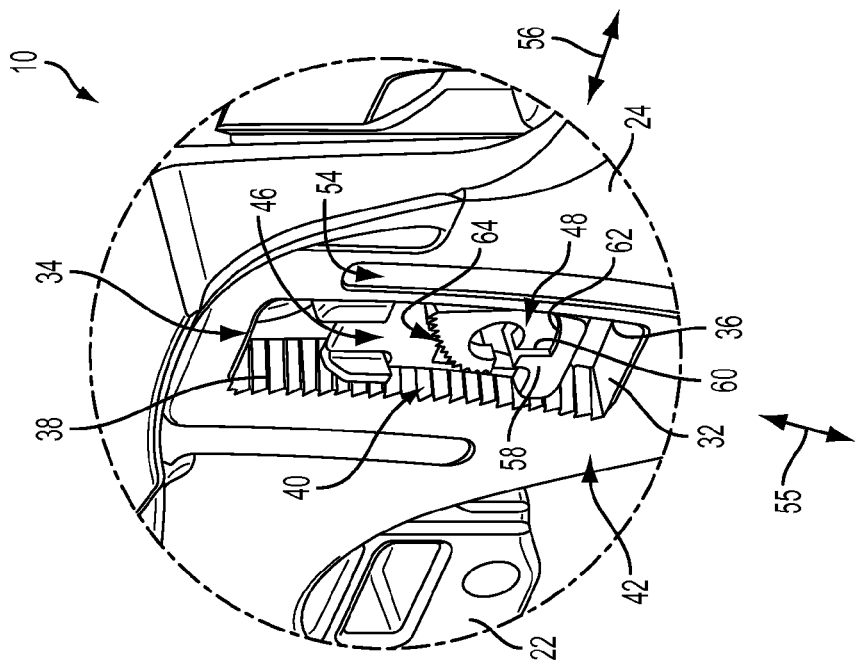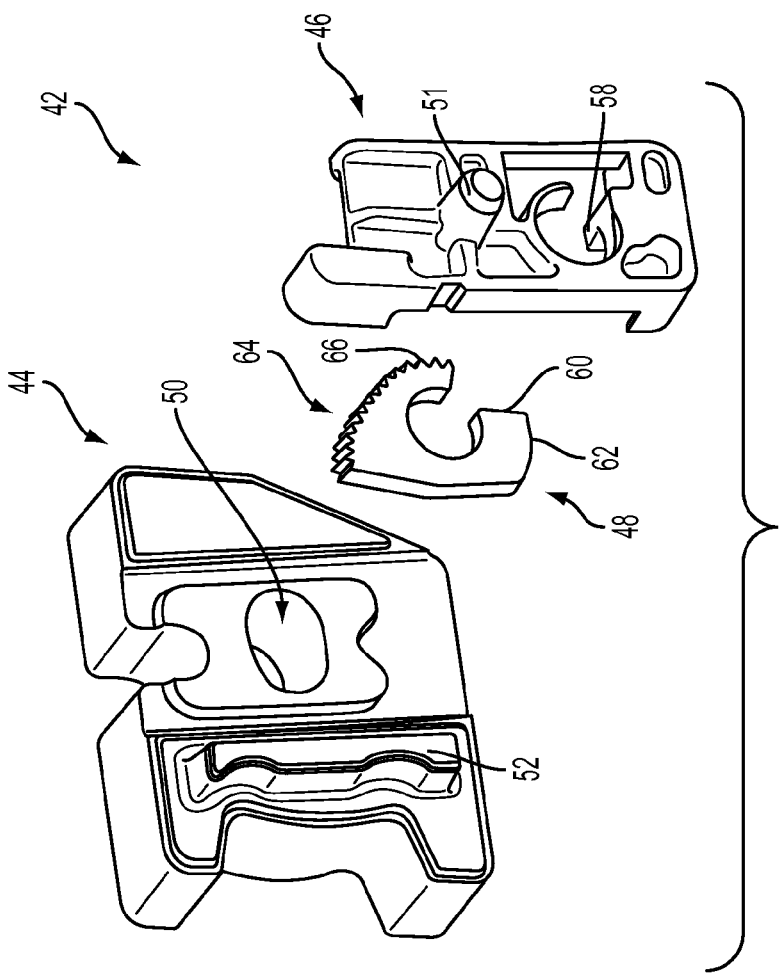

STEERING COLUMN ENERGY ABSORBING RAKE LOCK

CROSS-REFERENCES TO RELATED APPLICATIONS

This patent application claims priority to U.S. Provisional Patent Application Ser. No. 61/779,385, filed Mar. 13, 2013 which is incorporated herein by reference in its entirety.

FIELD OF THE INVENTION

The following description relates to steering columns for motor vehicles and, more specifically, to a rake lock mechanism for a steering column.

BACKGROUND

Some known steering columns for motor vehicles are provided with mechanisms for adjusting the steering column position by an operator of the motor vehicle. Available adjustments typically include a telescoping adjustment in which the steering column is extended toward the operator or retracted away from the operator, and a tilt or rake adjustment in which an angular position of the steering column is changed relative to the operator.

In some known systems, rake is adjusted by releasing an adjustment lever from a secured position, which then allows for rotation of the steering column about a pivot, typically located at an end of the steering column opposite that of the of the steering wheel. Returning the adjustment lever to the secured position retains the steering column in a desired set position about the pivot.

In a vehicle impact event, the steering column is configured to absorb energy of the impact to prevent or reduce injury to the operator due to collision with the steering wheel. In doing so, it is desired to further lock the rake position of the steering column to allow controlled energy absorption in such situations. In some steering column designs, during a collapse cycle, the column is designed to disengage the shaft and jacket assembly from the column mounting bracket. This allows the shaft and jacket assembly to shuttle forward in a vehicle, which allows the column to unclamp to facilitate internal collapse. At this point, rake lock needs to be maintained or re-established.

Accordingly, it is desirable to provide an energy absorbing rake lock assembly configured to re-establish rake lock during an impact event and provide high rake direction load retention without requiring high levels of forward loading.

SUMMARY OF THE INVENTION

In an embodiment of the invention, a rake lock assembly for a vehicle steering column assembly having a rake bolt and a rake bracket with an inner wall that includes a plurality of rake teeth is provided. The rake lock assembly includes a component operatively associated with the rake bracket, the component including a trigger element, and a locking cam configured to be disposed within the rake bracket and to rotate about a rotational axis. The locking cam includes a first contact surface configured to interact with the trigger element, and a second contact surface having a plurality of teeth configured to interact with the rake teeth. When an impact force acts on the steering column assembly and the rake bolt is shuttled in a first direction, the trigger element is configured to contact the first contact surface and rotate the locking cam about the rotational axis such that the second contact surface plurality of teeth and the rake teeth are disposed in interlocking meshing engagement to facilitate preventing a vehicle steering column from raking movement in a second direction.

In another embodiment of the invention, a steering column assembly is provided. The steering column assembly includes a rake bracket having an inner wall defining a rake bracket opening, at least a portion of the inner wall including a plurality of rake teeth, a steering column movably coupled to the rake bracket for raking movement in a first direction, and a rake bolt extending through the rake bracket opening. The assembly further includes a rake lock assembly operatively associated with the rake bracket and the rake bolt. The rake lock assembly includes a component operatively associated with the rake bracket, the component including a trigger element, and a locking cam configured to be disposed within the rake bracket opening and to rotate about a rotational axis. The locking cam includes a first contact surface configured to interact with the trigger element, and a second contact surface having a plurality teeth configured to interact with the rake teeth. When an impact force acts on the steering column assembly and the rake bolt is shuttled in a second direction, the trigger element is configured to contact the first contact surface and rotate the locking cam about the rotational axis such that the second contact surface plurality of teeth and the rake teeth are disposed in interlocking meshing engagement to facilitate preventing the steering column from raking movement in the first direction.

In yet another embodiment of the invention, a method of assembling a steering column assembly is provided. The method includes providing a rake bracket having an inner wall defining a rake bracket opening, at least a portion of the inner wall including a plurality of rake teeth, providing a steering column movably coupled to the steering column for raking movement in a first direction, and inserting a rake bolt through the rake bracket opening. The method further includes operatively associating a component with the rake bracket, the component including a trigger element, and disposing a locking cam within the rake bracket opening. The locking cam is configured to rotate about a rotational axis. The locking cam has a first contact surface configured to interact with the trigger element, and a second contact surface having a plurality of teeth configured to interact with the rake teeth. When an impact force acts on the steering column assembly and the rake bolt is shuttled in a second direction, the trigger element is configured to contact the first contact surface and rotate the locking cam about the rotational axis such that the second contact surface plurality of teeth and the rake teeth are disposed in interlocking meshing engagement to facilitate preventing the steering column from raking movement in the first direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a rear perspective view of components shown in FIG. 2;

FIG. 4 is a perspective view of a portion of the steering column shown in FIG. 1 with a lever and a clamp cam removed;

DETAILED DESCRIPTION

Figure 1:
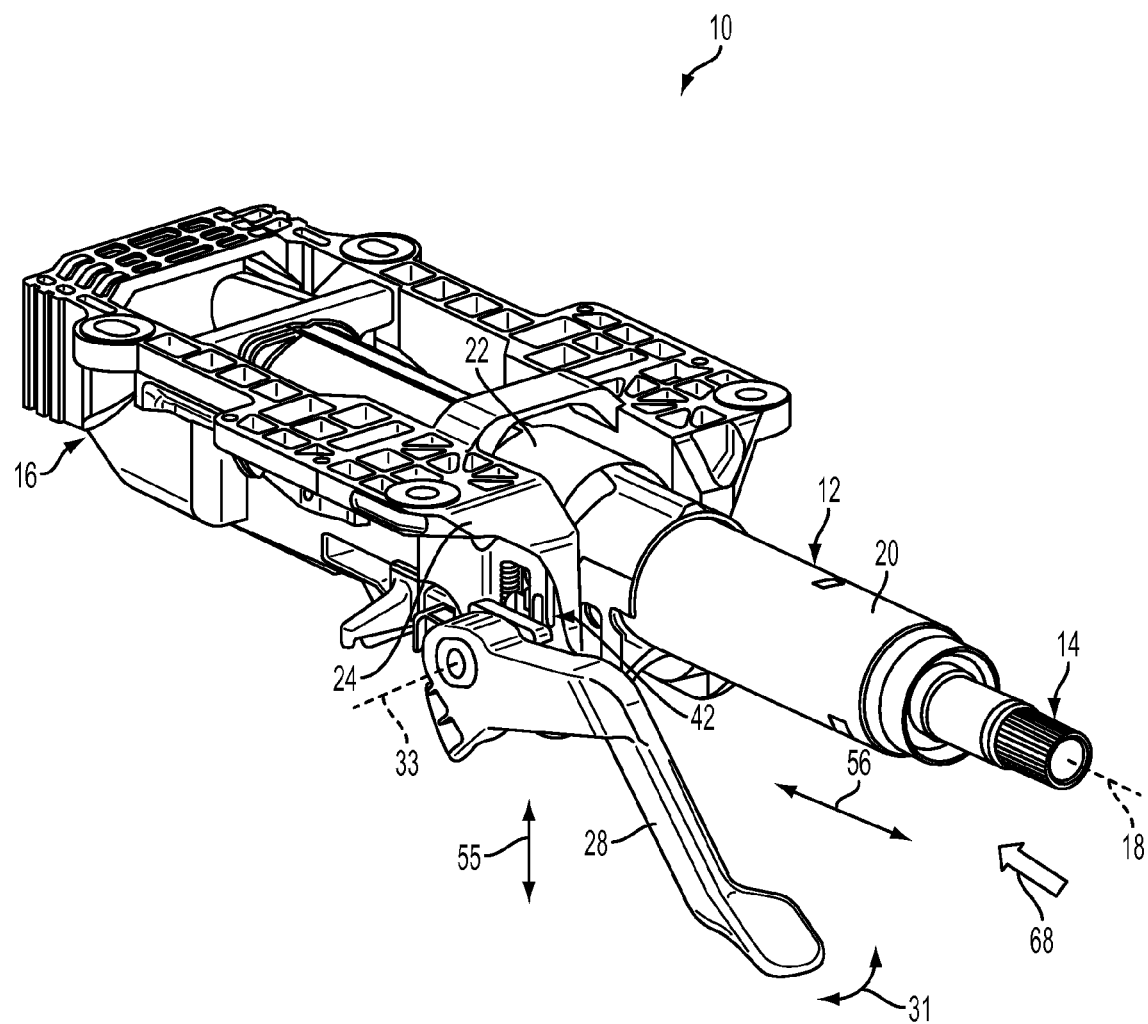
FIG. 1 is a perspective view of a steering column in accordance with exemplary embodiments of the invention.
Figure 2:
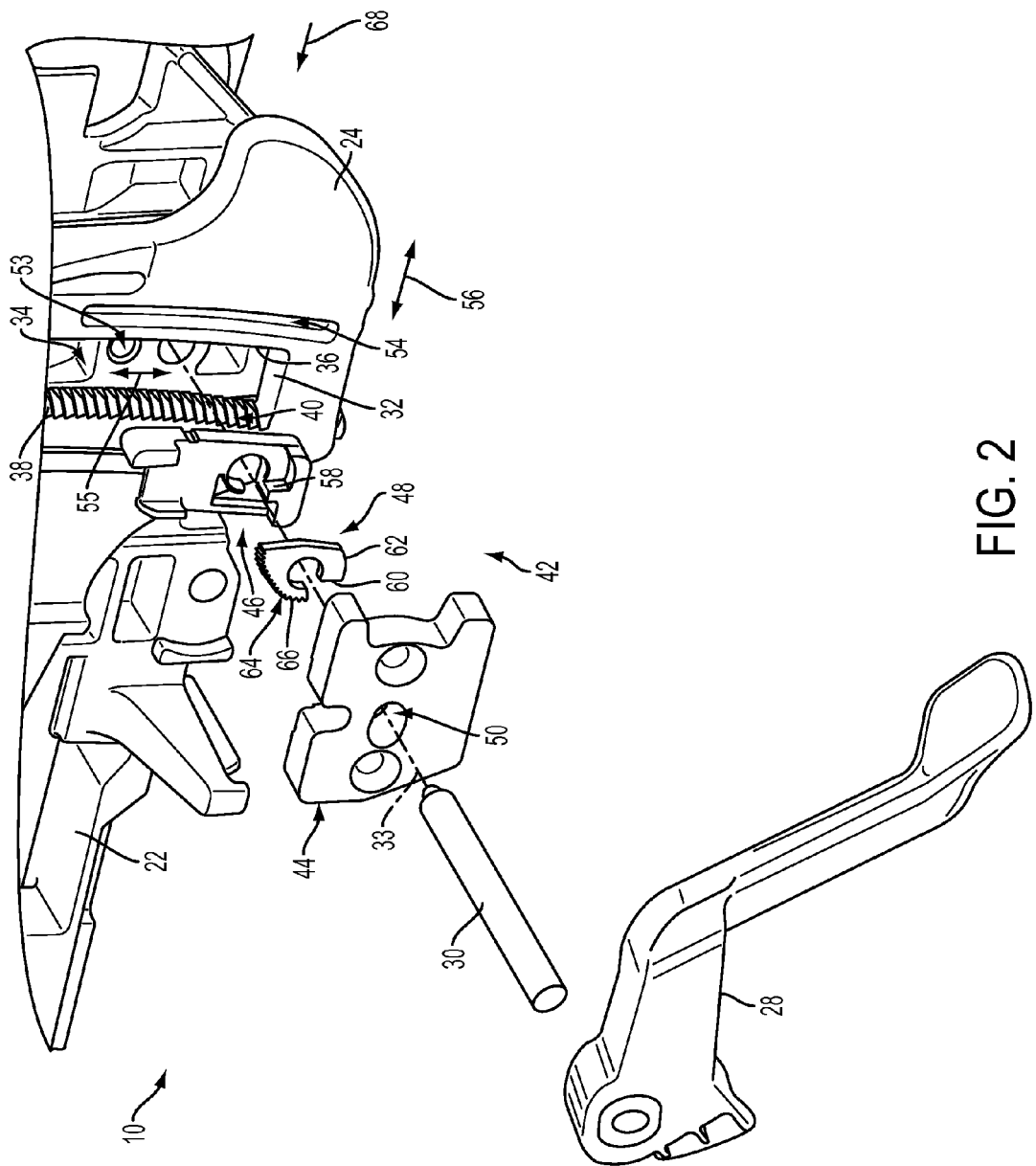
FIG. 2 is an exploded view of a portion of the steering column shown in FIG. 1.

Referring now to the Figures, where the invention will be described with reference to specific embodiments, without limiting same, FIG. 1 illustrates a steering column assembly 10 for a motor vehicle. Steering column assembly 10 includes a column 12 having a first end 14 and a second end 16. Column first end 14 is connectable to a steering wheel (not shown) or other operator control, and column second end 16 is operably connected to a steering system that translates rotational motion of column 12 about a column axis 18 into steering motion of the motor vehicle.

In the exemplary embodiment, column 12 includes an upper jacket 20 and a lower jacket 22. Upper jacket 20 extends from first end 14 and is at least partially located in lower jacket 22, which extends from second end 16 toward first end 14. Motion of upper jacket 20 in lower jacket 22 along column axis 18 is a telescopic adjustment of steering column assembly 10. Alternatively, lower jacket 22 may be at least partially located inside upper jacket 20.

Lower jacket 22 is pivotally coupled to a mounting bracket or rake bracket 24 to facilitate adjusting a rake position of column 12 with an adjustment lever 28, which is coupled to a rake bolt 30 having one or more integral clamp cam members (not shown). When adjustment lever 28 is rotated to a secured position, as in FIG. 1, rake bolt 30 is rotated such that the cam members frictionally engage portions of column 12 to hold a rake position of column 12. When adjustment lever 28 is rotated to a released position in the direction of arrow 31, rake bolt 30 rotates such that the frictional engagement of the cam members to column 12 is released, thereby allowing a change in rake position of column 12.

In a vehicle impact event, it is desirable to further lock the rake position of column 12. To that end, as further illustrated in FIGS. 2-5, rake bracket 24 includes an inner wall 32 defining a rake bracket opening 34 configured to receive rake bolt 30. Inner wall 32 includes a rear wall 36 and a forward wall 38 having a plurality of rake teeth 40. Alternatively, rake teeth 40 may be a separate component coupled to forward wall 38.

Steering column assembly 10 includes a rake lock assembly 42 configured to lock steering column 12 in the rake direction during a crash event. Rake lock assembly 42 includes a clamp cam 44, a retainer 46, and a locking cam 48.

In the exemplary embodiment, clamp cam 44 is disposed at rake bracket opening 34 and includes a slotted bolt opening 50 to facilitate forward translation of rake bolt 30 therein. Clamp cam 44 also includes a protrusion 52 (FIG. 3) that extends into a slot 54 (FIG. 2) formed in rake bracket 24 to facilitate translation of clamp cam 44 in the rake direction represented by arrows 55. Further, clamp cam protrusion 52 and slot 54 facilitate keeping clamp cam 42 stationary with respect to rake bolt 30 during a crash and preventing movement in the forward and aft directions represented by arrows 56.

Retainer 46 is oriented within rake bracket opening 34 and is secured to rake bracket 24 in a manner that facilitates translation in rake direction 55, but prevents movement in the forward/aft directions 56 during a crash event. For example, a boss 51 (FIG. 3) may be inserted into a rake bracket aperture 53 (FIG. 2) for coupling therebetween. Alternatively, retainer 46 may be coupled to or made integral with clamp cam 44. In the exemplary embodiment, retainer 46 includes a projection or trigger element 58 that is configured to interact with locking cam 48 during a crash event, as is described herein in more detail.

Locking cam 48 is oriented within rake bracket opening 34 and is rotatably coupled to rake bolt 30 about a rake bolt axis 33. Locking cam 48 includes a first contact edge 60, a second contact edge 62, and a third contact edge 64. During a crash event, first contact edge 60 is configured to interact with trigger element 58, second contact edge 62 is configured to interact with rear wall 36, and third contact edge 64 includes a plurality of teeth 66 configured to interact with rake teeth 40 of forward wall 38.

Figure 5:
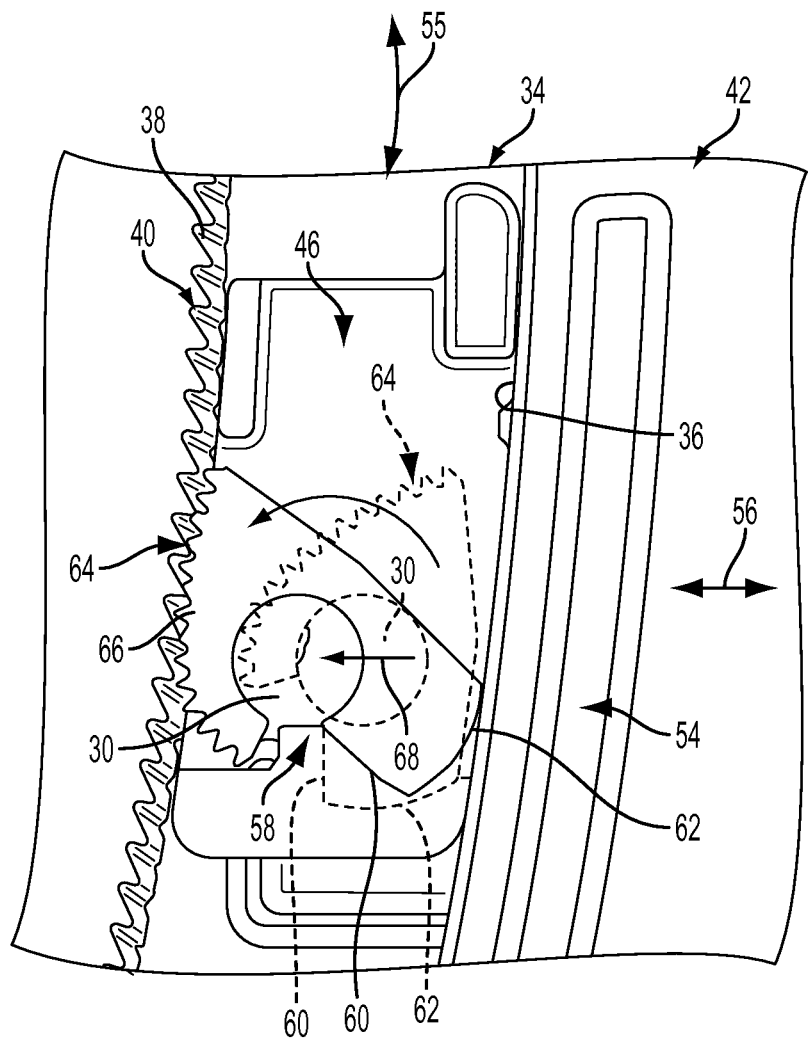
FIG. 5 is a side view of the steering column shown in FIG. 4 with a locking cam shown in a first position and a second position shown in phantom.

In operation during an impact event, as a collapse cycle of column 12 occurs, shuttle motion of rake bolt 30 in a forward direction (shown by arrow 68) forces locking cam first contact edge 60 against trigger element 58. Because retainer 46 and therefore trigger element 58 are secured from movement in crash force direction 68, trigger element 58 causes locking cam 48 to rotate counter-clockwise about axis 33 as shown in FIG. 5 such that third contact edge 64 and teeth 66 are disposed in interlocking meshing engagement with rake teeth 40. As a result, steering column 12 is locked in the raking direction 55. As illustrated in FIG. 5, locking cam 48 is shown both in a pre-impact position (shown in phantom) and in a post-impact, locking position.

Further, after rotation of locking cam 48, second contact edge 62 is oriented in close proximity to or abuts rake bracket rear wall 36. This facilitates resisting movement of locking cam 48 in a rearward direction opposite arrow 68 if such resistance is desired; as such movement may result in disengagement between rake teeth 40 and locking cam teeth 66, which could enable movement of column 12 in rake direction 55.

Although not illustrated, an alternate embodiment of rake lock assembly 42 includes locking cam 48 rotatably coupled about a shuttling element other than rake bolt 33. For example, locking cam 48 may be rotatably coupled about a pivot member (not shown) extending from lower jacket 22, which is configured to shuttle in the forward direction 68 during a crash event.

Similar to the embodiment described in FIGS. 1-5, as a collapse cycle of column 12 occurs, shuttle motion of the pivot member in forward direction 68 forces locking cam first contact edge 60 against trigger element 58. In this configuration, trigger element 58 may be located on a different portion of retainer 46, or retainer 46 may be oriented in a different position with respect to rake bracket 24 and rake bracket opening 34 that enables rake lock assembly 42 to function as described herein. Because retainer 46 and therefore trigger element 58 are secured from movement in crash force direction 68, trigger element 58 causes locking cam 48 to rotate counter-clockwise about axis 33 such that third contact edge 64 and teeth 66 are disposed in interlocking meshing engagement with rake teeth 40. As a result, steering column 12 is locked in the raking direction 55. Further, after rotation of locking cam 48, second contact edge 62 is oriented in close proximity to or abuts rake bracket rear wall 36 to facilitate resisting movement of locking cam 48 in a rearward direction opposite arrow 68, if desired.

A method of assembling rake lock assembly 42 includes providing steering column assembly 10 having rake bracket 24, rake bolt 30, and rake lock assembly 42. Rake teeth 40 are formed on rake bracket opening forward wall 38. Clamp cam 44 is provided with slotted bolt opening 50 and protrusion 52 configured for insertion into rake bracket slot 54. Retainer 46 is provided trigger element 58. Locking cam 48 is provided with first contact edge 60 configured to interact with trigger element 58, second contact edge 62 configured to interact with rear wall 36, and third contact edge 64 having teeth 66 configured to interact with rake teeth 40. Locking cam 48 is rotatably coupled to rake bolt 30 or other pivot member to facilitate rotation of locking cam 48 when rake bolt 30 or the pivot member are shuttled forward in a crash event such that teeth 66 are disposed in interlocking meshing engagement with rake teeth 40 to lock steering column 12 in the raking direction.

Figure 6:
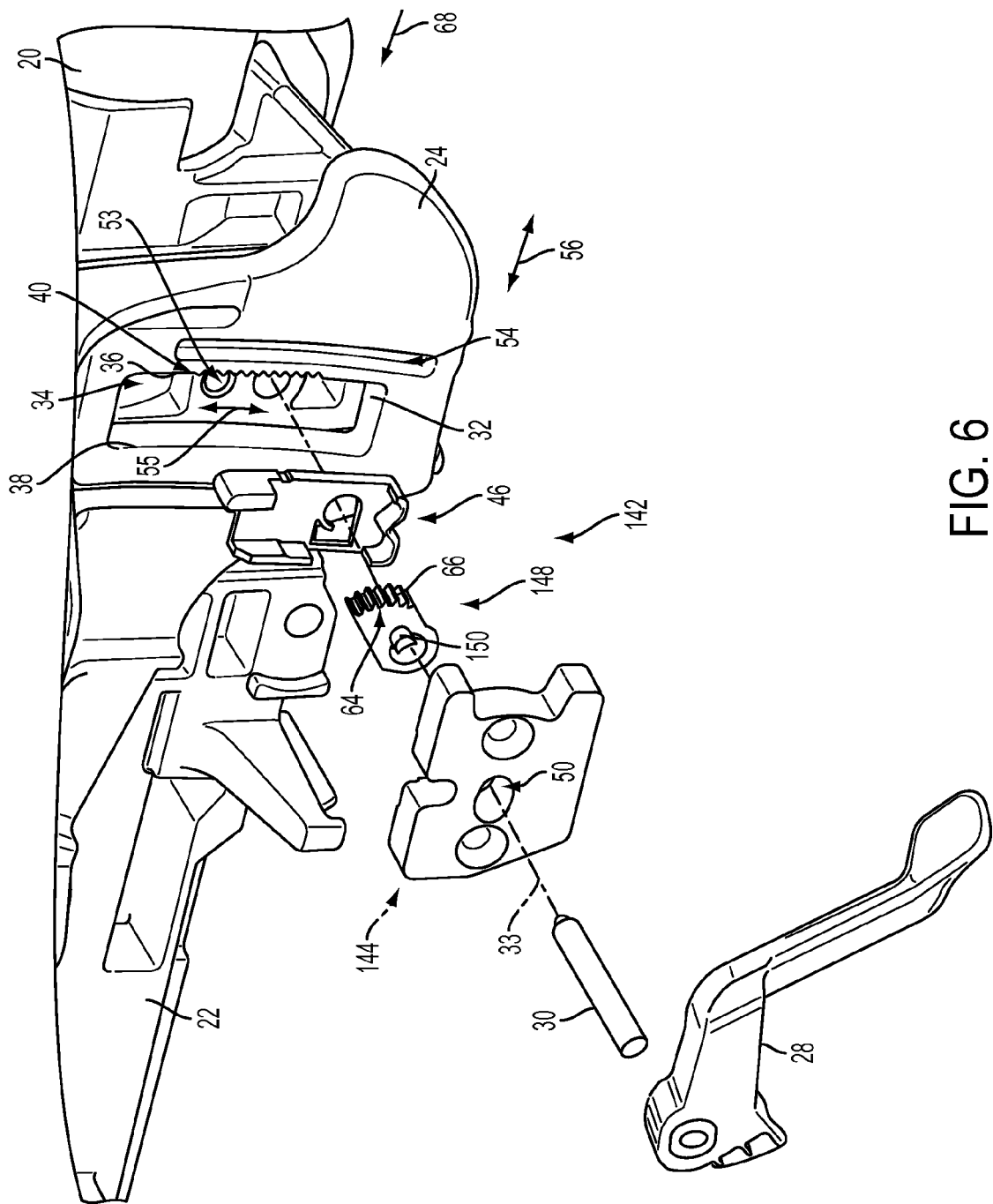
FIG. 6 is an exploded view of a portion of a steering column in accordance with another exemplary embodiment of the invention.
Figure 7:
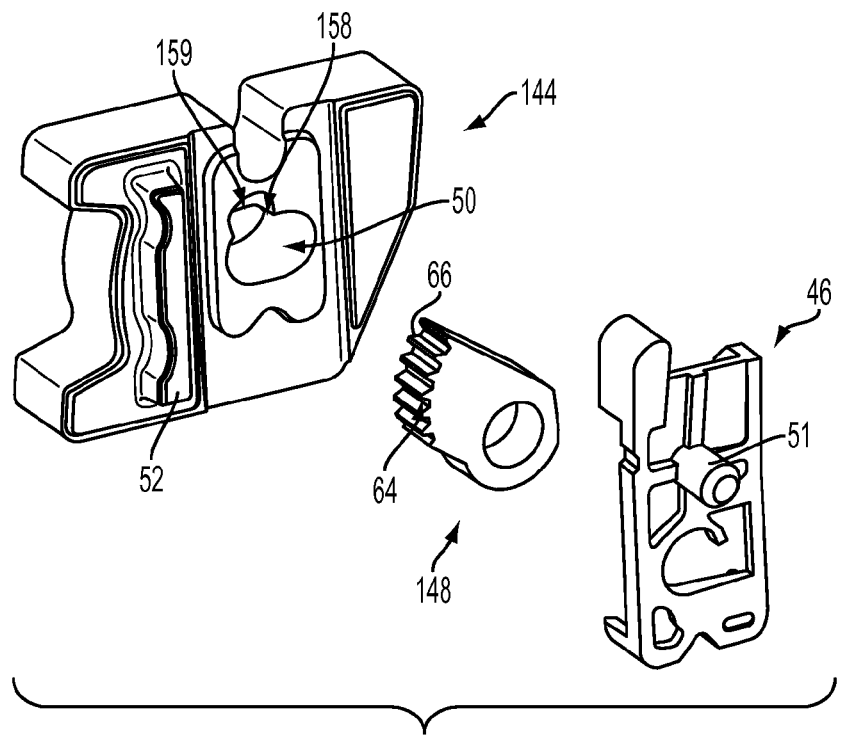
FIG. 7 is a rear perspective view of components shown in FIG. 6.
Figure 8:
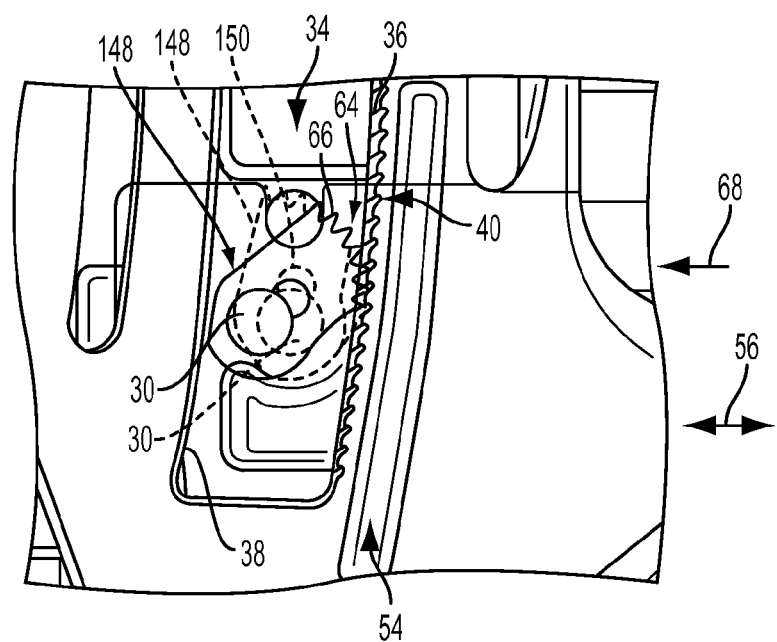
FIG. 8 is a side view of a portion of the steering column shown in FIG. 6, after assembly with a lever and a clamp cam removed, and with a locking cam shown in a first position and a second position shown in phantom.

FIGS. 6-8 illustrate an alternate rake lock assembly 142 that is similar to the forward shuttling, forward rotating rake lock assembly 42 shown in FIGS. 1-5, except rake lock assembly 142 is a forward shuttling, aft or rearward rotating rake lock assembly. Like reference numerals indicate like parts.

As shown in FIG. 6, rake bracket 24 includes rake teeth 40 formed on rear wall 36 as opposed to forward wall 38, and rake lock assembly 142 includes a clamp cam 144 and a locking cam 148. In this embodiment, clamp cam 144 includes a trigger element 158 (FIG. 7) that is configured to interact with a cam trigger member 150 (FIG. 6) extending from locking cam 148 during a crash event.

In operation during an impact event, as a collapse cycle of column 12 occurs, shuttle motion of rake bolt 30 in forward direction 68 forces locking cam trigger member 150 against trigger element 158, which is at least partially defined by a cutout 159. Because clamp cam 144 and therefore trigger element 158 are secured from movement in crash force direction 68, trigger element 158 causes locking cam 148 to rotate clockwise about axis 33 (as shown in FIG. 6) such that third contact edge 64 and teeth 66 are disposed in interlocking meshing engagement with rake teeth 40. As a result, steering column 12 is locked in the raking direction 55. As illustrated in FIG. 8, locking cam 148 is shown both in a pre-impact position (shown in phantom) and in a post-impact, locking position.

Although not shown, an alternate embodiment of rake lock assembly 142 includes locking cam 148 rotatably coupled about a shuttling element other than rake bolt 33. For example, locking cam 148 may be rotatably coupled about a pivot member (not shown) extending from lower jacket 22, which is configured to shuttle in the forward direction 68 during a crash event.

Similar to the embodiment described in FIGS. 6-8, as a collapse cycle of column 12 occurs, shuttle motion of the pivot member in forward direction 68 forces locking cam trigger member 150 against trigger element 158. In this configuration, trigger element 158 may be located on a different portion of clamp cam 144, or clamp cam 144 may have a different shape that enables rake lock assembly 42 to function as described herein. Because clamp cam 144 and therefore trigger element 158 are secured from movement in crash force direction 68, trigger element 158 causes locking cam 148 to rotate clockwise about the pivot member such that contact edge 64 and teeth 66 are disposed in interlocking meshing engagement with rake teeth 40. As a result, steering column 12 is locked in the raking direction 55.

A method of assembling rake lock assembly 142 includes providing steering column assembly 10 having rake bracket 24, rake bolt 30, and rake lock assembly 42. Rake teeth 40 are formed on rake bracket opening rear wall 36. Clamp cam 144 is provided with slotted bolt opening 50, protrusion 52 configured for insertion into rake bracket slot 54, and trigger element 158. Retainer 46 may be provided, and locking cam 148 is provided with trigger member 150 configured to interact with trigger element 158, and contact edge 64 having teeth 66 configured to interact with rake teeth 40. Locking cam 148 is rotatably coupled to rake bolt 30 or other pivot member to facilitate rotation of locking cam 148 when rake bolt 30 or the pivot member are shuttled forward in a crash event such that teeth 66 are disposed in interlocking meshing engagement with rake teeth 40 to lock steering column 12 in the raking direction.

Figure 9:
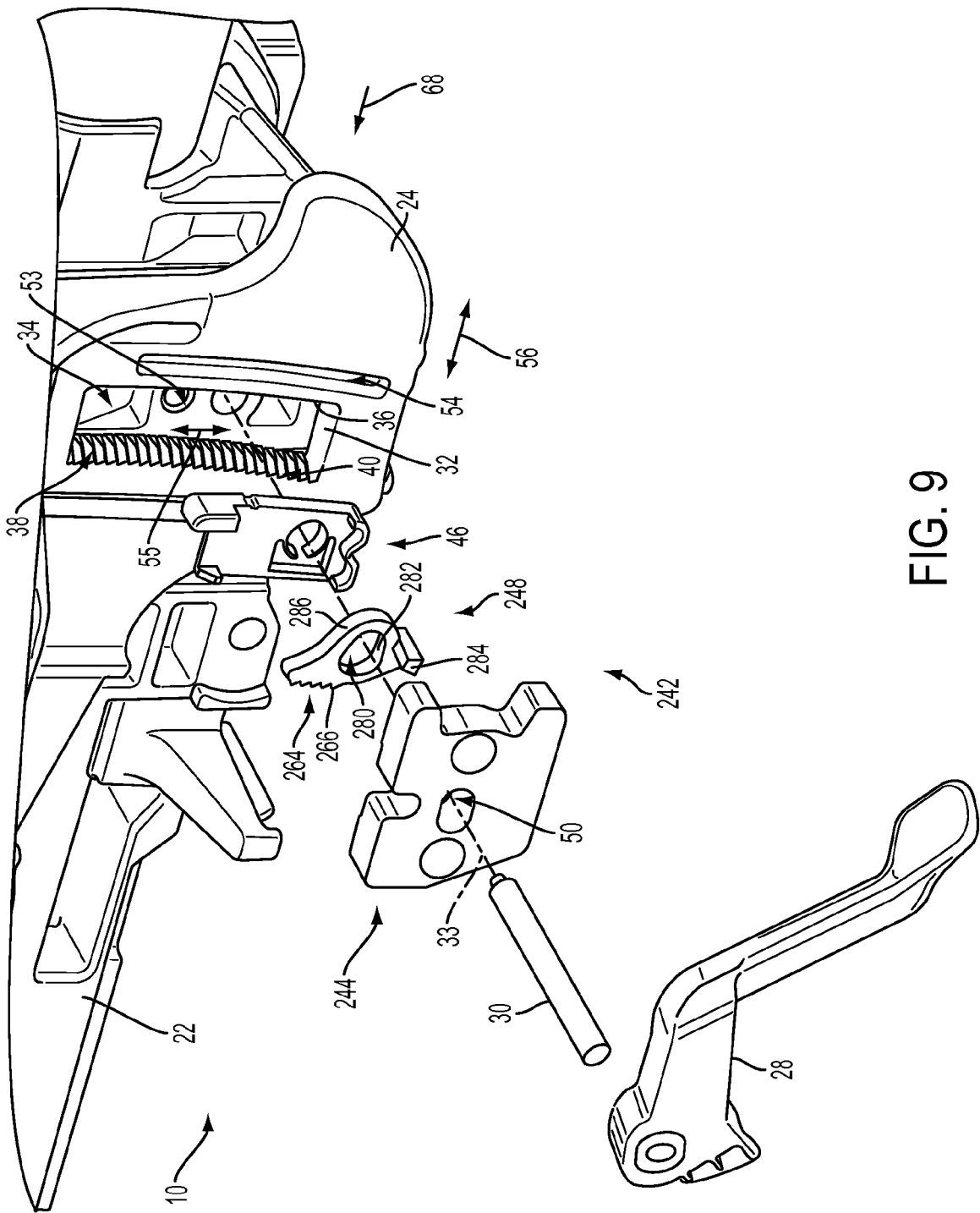
FIG. 9 is an exploded view of a portion of a steering column in accordance with yet another exemplary embodiment of the invention.
Figure 10:
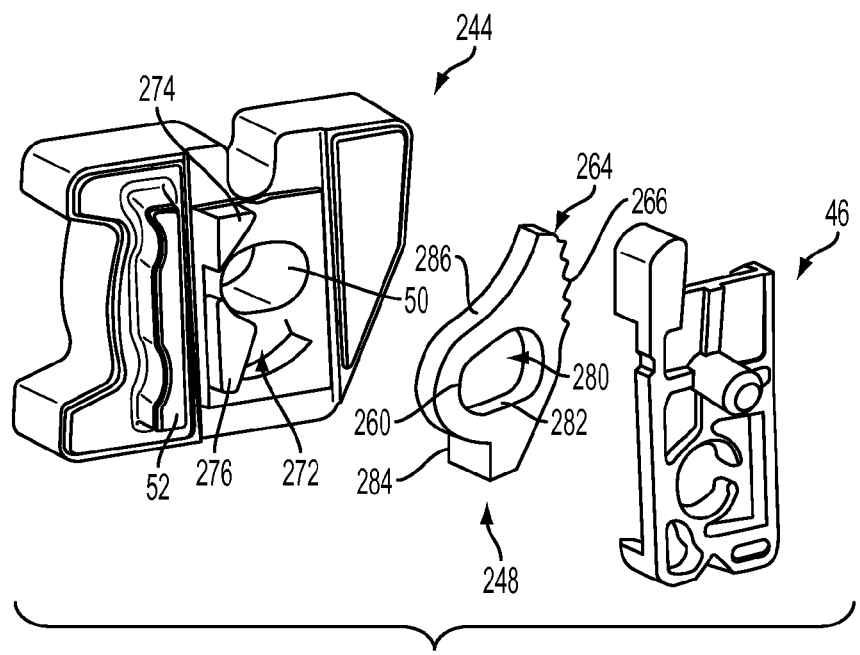
FIG. 10 is a rear perspective view of components shown in FIG. 9.
Figure 11:
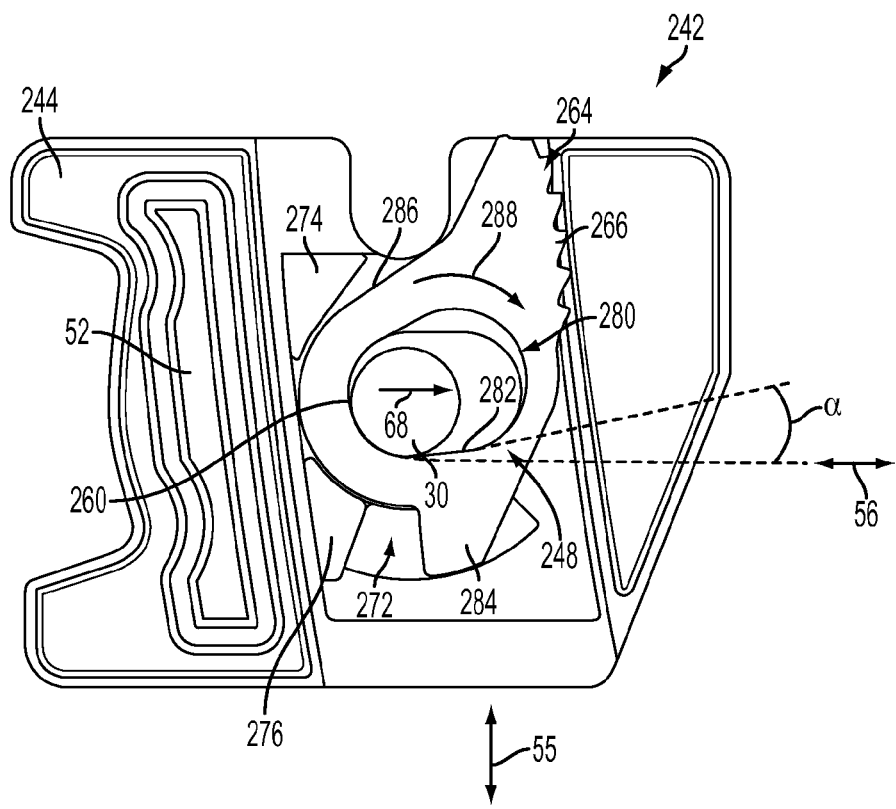
FIG. 11 is a side view of a portion of the steering column shown in FIG. 9, after assembly with a lever and a clamp cam removed.

FIGS. 9-11 illustrate an alternate rake lock assembly 242 that is similar to the forward shuttling, forward rotating rake lock assembly 42 shown in FIGS. 1-5, except rake lock assembly 242 is a forward shuttling, slotted rake lock assembly. In the exemplary embodiment, rake lock assembly 242 includes a clamp cam 244 and a slotted locking cam 248.

Clamp cam 244 includes a guide slot 272 (FIG. 10), a first contact projection 274, and a second contact projection 276. Slotted locking cam 248 includes a slotted aperture 280 to receive rake bolt 30, a first contact edge 260, a second contact edge 264, an angled slot edge 282, and a guide pin 284 (FIG. 9) extending therefrom. In a normal operating state, a locking cam edge portion 286 abuts or is in close proximity to first contact projection 274 (FIG. 11). During a crash event, rake bolt 30 is configured to interact with angled slot edge 282, and second contact edge 264 includes a plurality of teeth 266 configured to interact with rake teeth 40 of forward wall 38.

In operation during an impact event, as a collapse cycle of column 12 occurs, shuttle motion of rake bolt 30 in forward direction 68 causes interaction between rake bolt 30 and angled slot edge 282 due to edge 282 being oriented at an angle 'α' (FIG. 11) with respect to crash force direction 68. This interaction causes cam lock guide pin 284 to translate along clamp cam guide 272, and locking cam 248 is guided in a rotation about axis 33 (as shown by arrow 288), which disposes second contact edge 264 and teeth 266 in interlocking meshing engagement with rake teeth 40. As a result, steering column 12 is locked in the raking direction 55.

A method of assembling rake lock assembly 242 includes providing steering column assembly 10 having rake bracket 24, rake bolt 30, and rake lock assembly 242. Rake teeth 40 are formed on forward wall 38. Clamp cam 244 is provided with slotted bolt opening 50, protrusion 52 configured for insertion into rake bracket slot 54, guide slot 272, first contact projection 274, and second contact projection 276. Retainer 46 may be provided, and locking cam 248 is provided with slotted aperture 280 and angled slot edge 282 configured to receive and interact with bolt 30. Locking cam 248 is also provided with a guide pin 284 configured to be received in guide slot 272, and second contact edge 264 having teeth 266 configured to interact with forward wall 38. Locking cam 248 is rotatably coupled to rake bolt 30 to facilitate rotation of locking cam 248 when rake bolt 30 is shuttled forward in a crash event and rake bolt 30 contacts angled slot edge 282. This causes rotation of locking cam 248 such that teeth 66 are disposed in interlocking meshing engagement with rake teeth 40, thereby locking steering column 12 in the raking direction.

Systems and methods for locking rake movement of a steering column during a crash event are described herein. The systems include an eccentric locking cam. As the collapse cycle occurs, the locking cam interacts with a trigger element, which may be a fixed element or a moving element such as or caused by motion of the bolt. Additional designs may include a stationary bolt axis and other moving elements (e.g., a lower jacket) that engage the locking cam during a crash event. These elements interact with the linear motion of the locking cam to rotate the cam. By defining the profile and placement of the trigger element(s), the locking cam profile features, and/or other interacting component elements, the locking cam's rotational speed as well as the extent of rotation may be controlled. As a result, the locking cam winds up and creates binding/locking in the rake direction. In addition, reaction features may be added to existing components and or additional components to further aid binding/locking.

As such, the systems described herein have high rake direction load protection without requiring high levels of forward loading. Moreover, the systems may function within small package environments with a limited number of engaged teeth.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rake lock assembly for a vehicle steering column assembly having a rake bolt and a rake bracket with an inner wall that includes a plurality of rake teeth, the rake lock assembly comprising:
    a component operatively associated with the rake bracket, the component including a trigger element; and
    a locking cam configured to be disposed within the rake bracket and to rotate about a rotational axis, the locking cam having a first contact surface configured to interact with the trigger element, and a second contact surface having a plurality of teeth configured to interact with the rake teeth,
    wherein when an impact force acts on the steering column assembly and the rake bolt is shuttled in a first direction, the trigger element is configured to contact the first contact surface and rotate the locking cam about the rotational axis such that the second contact surface plurality of teeth and the rake teeth are disposed in interlocking meshing engagement to facilitate preventing a vehicle steering column from raking movement in a second direction.

2. The rake lock assembly of claim 1, wherein the locking cam further includes a third contact surface configured to interact with the rake bracket inner wall when the second contact surface plurality of teeth and the rake teeth are engaged to facilitate preventing movement of the locking cam in one of the first direction or a third direction opposite the first direction.

3. The rake lock assembly of claim 1, wherein the component comprises a retainer configured to be disposed about the rake bolt, wherein the retainer is configured to be coupled to the steering column assembly such that the retainer is secured from movement in the first direction when the rake bolt is shuttled in the first direction.

4. The rake lock assembly of claim 1, wherein the component comprises a clamp cam configured to be disposed about the rake bolt, wherein the clamp cam is configured to be coupled to the rake bracket such that the clamp cam is secured from movement in the first direction when the rake bolt is shuttled in the first direction, wherein the locking cam first contact surface includes a cam trigger member extending therefrom substantially parallel to the rotational axis.

5. The rake lock assembly of claim 1, wherein the locking cam is configured to be disposed about the rake bolt and to rotate about an axis of the rake bolt.

6. The rake lock assembly of claim 5, wherein the locking cam is configured to rotate toward the first direction to engage the rake teeth.

7. The rake lock assembly of claim 5, wherein the locking cam is configured to rotate toward a third direction opposite the first direction to engage the rake teeth.

8. A steering column assembly comprising:
    a rake bracket having an inner wall defining a rake bracket opening, at least a portion of the inner wall including a plurality of rake teeth;
    a steering column movably coupled to the rake bracket for raking movement in a first direction;
    a rake bolt extending through the rake bracket opening;
    a rake lock assembly operatively associated with the rake bracket and the rake bolt, the rake lock assembly comprising:
        a component operatively associated with the rake bracket, the component including a trigger element; and
        a locking cam configured to be disposed within the rake bracket opening and to rotate about a rotational axis, the locking cam having a first contact surface configured to interact with the trigger element, and a second contact surface having a plurality teeth configured to interact with the rake teeth,
        wherein when an impact force acts on the steering column assembly and the rake bolt is shuttled in a second direction, the trigger element is configured to contact the first contact surface and rotate the locking cam about the rotational axis such that the second contact surface plurality of teeth and the rake teeth are disposed in interlocking meshing engagement to facilitate preventing the steering column from raking movement in the first direction.

9. The steering column assembly of claim 8, wherein the locking cam further includes a third contact surface configured to interact with the rake bracket inner wall when the second contact surface plurality of teeth and the rake teeth are engaged to facilitate preventing movement of the locking cam in one of the second direction or a third direction opposite the second direction.

10. The steering column assembly of claim 8, wherein the component comprises a retainer disposed about the rake bolt within the rake bracket opening, wherein the retainer is coupled to the steering column assembly such that the retainer is secured from movement in the second direction when the rake bolt is shuttled in the second direction.

11. The steering column assembly of claim 8, wherein the component comprises a clamp cam disposed about the rake bolt, wherein the clamp cam is coupled to the rake bracket such that the clamp cam is secured from movement in the second direction when the rake bolt is shuttled in the second direction, and wherein the locking cam first contact surface includes a cam trigger member extending therefrom substantially parallel to the rotational axis.

12. The steering column assembly of claim 8, wherein the locking cam is disposed about the rake bolt to rotate about an axis of the rake bolt, wherein the rotational axis and the rake bolt axis are coaxial.

13. The steering column assembly of claim 12, wherein the locking cam is configured to rotate toward the second direction to engage the rake teeth.

14. The steering column assembly of claim 12, wherein the locking cam is configured to rotate toward a third direction opposite the second direction to engage the rake teeth.

15. A method of assembling a steering column assembly, the method comprising:
providing a rake bracket having an inner wall defining a rake bracket opening, at least a portion of the inner wall including a plurality of rake teeth;
providing a steering column movably coupled to the steering column for raking movement in a first direction;
inserting a rake bolt through the rake bracket opening;
operatively associating a component with the rake bracket, the component including a trigger element; and
disposing a locking cam within the rake bracket opening, the locking cam configured to rotate about a rotational axis, the locking cam having a first contact surface configured to interact with the trigger element, and a second contact surface having a plurality of teeth configured to interact with the rake teeth,
wherein when an impact force acts on the steering column assembly and the rake bolt is shuttled in a second direction, the trigger element is configured to contact the first contact surface and rotate the locking cam about the rotational axis such that the second contact surface plurality of teeth and the rake teeth are disposed in interlocking meshing engagement to facilitate preventing the steering column from raking movement in the first direction.

16. A rake lock assembly for a vehicle steering column assembly, comprising:
a component operatively associated with a rake bracket having an inner wall that includes a plurality of rake teeth, the component including a trigger element; and
a locking cam configured to be disposed within the rake bracket and to rotate about a rotational axis, the locking cam having a first contact surface configured to interact with the trigger element, and a second contact surface having a plurality of teeth configured to interact with the rake teeth,
wherein when an impact force acts on the steering column assembly and the component is shuttled in a first direction, the trigger element is configured to contact the first contact surface and rotate the locking cam about the rotational axis such that the second contact surface plurality of teeth and the rake teeth are disposed in interlocking meshing engagement to facilitate preventing a vehicle steering column from raking movement in a second direction.

* * * * *